Patented May 9, 1939

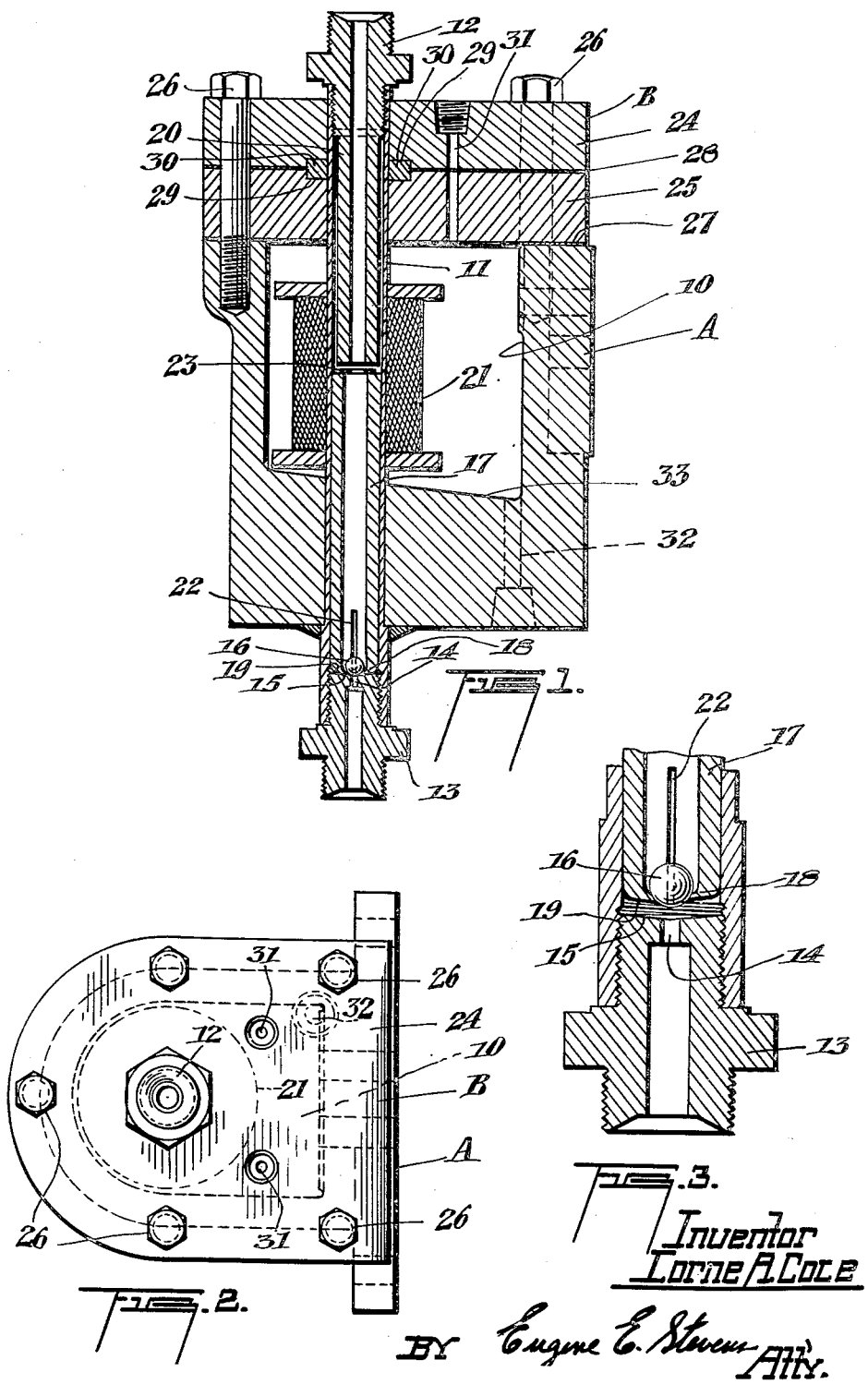

2,157,480

UNITED STATES PATENT OFFICE 2,157,480

MAGNETIC VALVE

Lorne A. Cole, Brantford, Ontario, Canada, assignor to Waterous Limited, Brantford, Ontario, Canada Application March 22, 1938, Serial No. 197,534

4 Claims. (Cl. 137—139)

This invention relates to magnetic valves.

While there have been a number of proposals for magnetic valves in the past, in most cases the structures have been complicated and have been of such a character that they cannot be employed under high pressures. Moreover, the parts have been subject to wear and in some cases the structures have been such as not to permit a free and unobstructed passageway therethrough. In one form of prior construction the gravity seating valve member, provided in the passageway to control the flow of the pressure medium, is unseated by means of a plunger rod extending centrally of the passageway and having a reduced end of pin-like character designed to project through the orifice in the valve seat and to push the valve member off the seat. This plunger construction not only provides an obstacle in the passageway but the pin is subjected to wear through constant contact with the valve member and as a result the valve is not as efficient as it might be and requires considerable maintenance.

It is an object of the present invention to avoid the disadvantages of the prior art and to provide a magnetic valve which is of generally simplified construction and positive in its action.

A further object of the invention is to provide a valve of this character which will withstand relatively high pressures.

A still further object of the invention is to provide a valve of this character wherein the cover for the casing is formed in a simple and novel manner so as to obviate any possibility of leakage.

A still further object of the invention is to provide an invention of this character wherein the parts are subject to very little wear and in which the parts are few and readily accessible whereby the valve may be easily assembled and requires little maintenance.

With these and other objects in view the invention consists generally in a casing having a fluid passageway therethrough in which a valve seat is positioned normally closed by a gravity seating valve and maintained in closed position as well by the pressure medium which it controls, the valve having a plunger member positioned within the passageway and formed with means surrounding a portion of the valve member and adapted to engage and lift the valve member when the plunger is raised through electromagnetic actuating means. The passageway through the casing is generally formed by a tube completely traversing the casing and housing the plunger which is preferably in the form of a movable metal tubular member formed clawlike at its lower end to surround a portion of the valve member, the tube also housing a second stationary metal tubular member permitting the pressure medium to pass through to the movable tubular member or plunger and to the valve seat without obstruction, the tube being surrounded by an electric coil in an area so as also to surround a part of the stationary tubular member and the plunger or the movable tubular member whereby the combination has the action of an iron-clad solenoid thereby to raise the plunger sharply, against the force of the pressure medium when the operating unit is energized. The casing normally filled with oil is closed by a two part cover and associated gaskets to prevent leakage.

The invention will be fully appreciated by reference to the following specification and accompanying drawing.

In the drawing:

Figure 1 is a longitudinal section taken through the centre of the valve showing the arrangement of parts when the plunger and valve member are in normal position.

Figure 2 is a top plan view of the valve.

Figure 3 is an enlarged detail section of the valve member, valve seat and plunger showing the plunger in raised position holding the valve member off its seat.

Referring to the drawing the valve is made up of the body or casing A which is generally recessed to form a housing 10 and is closed by a cover construction B. Preferably traversing all parts of the valve casing and passing through the housing 10 is a tube 11, the bore of which provides a passageway extending completely through the valve casing and isolated therefrom. The tube 11 is formed from a non-magnetic and preferably non-corrosive material. Suitable union connections 12 and 13 may be connected to the top and bottom of the tube 11. In the form of construction shown the top of the union member 13 is provided with a restricted outlet aperture 14 and a valve seat 15, the latter being preferably given a 5° taper towards the centre to form a suitable seat over the aperture 14 to receive a valve member 16 shown in the form of a ball check which normally is seated as shown in Figure 1.

Within the lower end of the passageway formed by the tube 11 a plunger 17 is positioned, preferably in the form of tubular member, the lower end of which has an opening of smaller diameter than the bore of this tubular member so as to provide around its bottom a substantially annular ledge or clawlike structure 18 generally tapered as shown. This ledge construction or clawlike structure surrounds a portion of the valve member 16 and will not permit the valve member to pass from the end of the plunger but will permit a portion of it to project below the plunger so that when the plunger is in lower normal position resting upon the top of the union member 13 the ball will be freely seated on the seat 15 positively closing the aperture 14 not only by gravity but also through the weight of the pressure medium above. The lower end of the plunger 17 is preferably tapered as at 19 corresponding to the seat 15 so that a close fit between the end of the plunger and the valve seat results. The plunger 17 is formed from a magnetic and preferably non-corrodible metal.

In the passageway above the plunger is positioned a tubular member 20 also of magnetic and preferably non-corrodible material which is held stationary and may be an integral part of the union member 12 as shown. The passageway in this tubular member 20 and also in the plunger 17 forms a part of the general passageway in the valve casing formed by the tube 11 permitting unobstructed passage of the pressure medium through to the valve seat where it may be held from passing through the valve by the seated valve member 16 or may be permitted to pass through the valve by raising the valve 16 from its seat.

Within the housing 10 and surrounding the tube 11 as well as the lower end of the tube 20 and upper end of plunger 17 is an electric coil 21 which when energized raises the plunger 17. The tubular member 20 forms a stationary core for the coil and the plunger a movable core. Thus it is clear that when the coil is energized the plunger 17 will be caused instantly to move upwardly thus raising the ball check from its seat and through the medium of suitable slits 22 or other suitable means formed in the lower end of the plunger 17 the pressure medium is permitted to pass on through the aperture 14 and out of the valve. When the coil is de-energized the plunger will drop back to its normal position, shown in Figure 1, to permit the valve to reseat, a suitable non-magnetic washer or the like 23 being carried on the upper end of the plunger 17 to prevent the plunger from being retained in engagement with the end of the member 20 through magnetic attraction.

The housing 10 is normally filled with oil or other suitable insulating fluid having a higher thermo-conductivity than air so as to cool as well as to insulate the coil 21 and leakage of this fluid from the housing is completely prevented by means of the special construction of the cover. This takes the form of two metal sections 24 and 25 bolted to the casing by means of cap screws 26 with a gasket 27 interposed between the casing and lower section 25 of the cover and a gasket 28 between the upper section 24 and lower section 23 of the cover. The opposed faces of the cover sections 24 and 25 are recessed as at 29, in an area which surrounds the openings for the tube 11, to receive a packing ring or rings 30 of compressible material so that when the cap screws 28 are tightened down not only are the gaskets 27 and 28 firmly compressed but the packing ring or rings 30 will likewise be firmly compressed and expanded so that the latter prevents leakage between the tube 11 and the cover sections, gasket 28 co-operating in this respect, while gasket 27 prevents leakage between the lower cover section 25 and the casing.

Suitable filling openings 31 designed to be closed by a screw plug may be provided through the covers communicating with the housing 10, while a drainage outlet 32 may be provided in the casing communicating with the bottom of the housing 10 the floor of which may be sloped as indicated at 33 towards one corner at which point the drainage opening 32 is positioned.

It will be apparent that the valve structure disclosed lends itself to a very sturdy construction and involves but a minimum of parts. Furthermore, it will be obvious that little wear can result through its operation and that the valve member will always be lifted sharply from its seat when the valve is operated and will always be permitted to seat positively when the actuating means is de-energized. The structure permits unobstructed flow of the pressure medium to the valve and is particularly adaptable to operate under comparatively high pressures and will operate at least through a range of from 5 to 350 pounds' pressure.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim is:

1. A magnetic valve comprising a casing having a fluid passageway therethrough, a tapered valve seat within the passageway, a gravity seating valve member normally positioned on said seat to prevent fluid from passing on through said passageway, a hollow plunger within said passageway having its lower end adjacent to said valve seat, said lower end of the plunger having at least one slot therein to permit the fluid to pass therethrough and having clawlike means to engage and grip a portion of said valve member while permitting another portion of said valve member to project below its lower end and into engagement with said valve seat when the plunger is in its normal position adjacent to said valve seat, the lower end of said plunger being tapered and seating on said tapered valve seat throughout that portion of the area of the latter surrounding the passageway and extending radially outward from the passageway to a substantial degree and electro-magnetic means for raising said plunger to unseat said valve member.

2. A magnetic valve comprising a casing having a fluid passageway therethrough formed by a tube positioned in the casing, a valve seat within the passageway, a gravity seating valve member normally positioned on said seat to prevent fluid from passing on through said passageway, an elongated hollow plunger within said passageway in free bearing engagement throughout its length with said tube, said plunger having its lower end adjacent to said valve seat, said lower end of the plunger having a plurality of radially located longitudinally disposed slots to permit fluid to pass therethrough above the valve and having clawlike means to engage and grip said valve member and adapted to lift said valve member from its seat when the plunger is raised, a stationary hollow tube positioned in the passageway above and spaced from the hollow plunger, said stationary hollow tube and said hollow plunger permitting unrestricted flow of the pressure medium through the passageway to the valve seat, an electric coil surrounding the tube in an area also surrounding a part of the stationary tubular member and hollow plunger whereby upon energizing said coil said hollow plunger is pulled upwardly against the stationary tube to raise the valve member from its seat, and non-magnetic means positioned between the hollow plunger and stationary tubular member to prevent said hollow plunger from being held in raised position by the stationary tubular member when said coil is de-energized.

3. A magnetic valve comprising a casing having a fluid passageway therethrough formed by a tubular member positioned within the casing, a valve seat within said passageway, a gravity seating valve member normally positioned on said seat to prevent fluid from passing on through said passageway, a plunger member within said passageway having means adapted to engage and lift said valve member from its seat, an electric coil surrounding the tube and a portion of said plunger for causing said plunger to move and lift the valve member from its seat when said coil is energized, a housing formed in the casing surrounding said coil and adapted to contain an insulating fluid immersing said coil, and cover means for the casing to enclose the housing including a pair of cooperating sections each having an opening designed to permit said tube to pass through, said sections each having a recessed portion in an area surrounding said openings to form between said sections a housing, compressible packing means within said housing between the sections, and gaskets between said sections and between one section and the casing, and securing means extending between said cover sections and said casing whereby upon tightening of said securing means said compressible packing is caused to engage said tube and said gaskets are caused to be compressed simultaneously to prevent leakage of said fluid from the casing.

4. A magnetic valve comprising a casing having a fluid passageway therethrough formed by a tubular member positioned within the casing, a tapered valve seat within the passageway, a gravity seating valve member normally positioned on said seat to prevent fluid from passing through said passageway, an elongated hollow plunger within said passageway in free bearing engagement with said tube throughout the extent of the plunger, said plunger having a tapered lower end to engage the valve seat surrounding the valve and a fluid passageway to permit fluid to pass therethrough, clawlike means formed on the end of the plunger to engage and grip said valve member permitting the latter to freely engage the valve seat when the end of the plunger is seated on said seat and adapted to lift said valve member from its seat when the plunger is raised, a stationary hollow core positioned in the passageway in alignment with and spaced from the hollow plunger said stationary core forming a continuation of the fluid passageway formed by the hollow plunger and electro-magnetic means surrounding the tube in an area also surrounding the adjacent ends of the stationary core and hollow plunger, through which said hollow plunger may be pulled upwardly against the stationary tube to raise the valve member from its seat.

LORNE A. COLE.